United States Patent
Klimczak et al.

(10) Patent No.: US 12,168,321 B2
(45) Date of Patent: Dec. 17, 2024

(54) LEVELER FOR 3D PRINTING BUILD PLATE THERMAL EXPANSION

(71) Applicant: JABIL INC., St. Petersburg, FL (US)

(72) Inventors: Scott Klimczak, St. Petersburg, FL (US); Luke Rodgers, St. Petersburg, FL (US); Darin Burgess, St. Petersburg, FL (US)

(73) Assignee: JABIL INC.

( * ) Notice: Subject to any disclaimer, the term of this patent is extended or adjusted under 35 U.S.C. 154(b) by 216 days.

(21) Appl. No.: 17/417,051

(22) PCT Filed: Dec. 18, 2019

(86) PCT No.: PCT/US2019/067146
§ 371 (c)(1),
(2) Date: Jun. 21, 2021

(87) PCT Pub. No.: WO2020/132052
PCT Pub. Date: Jun. 25, 2020

(65) Prior Publication Data
US 2022/0048249 A1    Feb. 17, 2022

Related U.S. Application Data

(60) Provisional application No. 62/783,016, filed on Dec. 20, 2018.

(51) Int. Cl.
*B29C 64/245* (2017.01)
*B29C 64/393* (2017.01)
*B33Y 30/00* (2015.01)

(52) U.S. Cl.
CPC .......... *B29C 64/245* (2017.08); *B29C 64/393* (2017.08); *B33Y 30/00* (2014.12)

(58) Field of Classification Search
None
See application file for complete search history.

(56) References Cited

U.S. PATENT DOCUMENTS

2015/0210007 A1   7/2015   Durand et al.
2015/0276119 A1*  10/2015  Booker ................. B29C 64/118
                                                              248/561

(Continued)

FOREIGN PATENT DOCUMENTS

CN           1324717      12/2001
CN           103974813    8/2014

(Continued)

OTHER PUBLICATIONS

The Hot End, Creality CR10 S5 500×500mm Review! Print Beyond Massive!, Mar. 15, 2018, YouTube, p. 1. (Year: 2018).*

(Continued)

*Primary Examiner* — Nahida Sultana
*Assistant Examiner* — Irak Nguon
(74) *Attorney, Agent, or Firm* — Riverside Law LLP

(57) ABSTRACT

An apparatus, system and method for limiting build plate expansion in a 3D print environment. The apparatus, system and method may include a decoupling leveler associated with mounts for a build plate in the print environment; and a plurality of adjustments passing substantially through and mounted within the decoupling leveler. The leveler may be decoupled from the mounts during heating and cooling of the print environment, and recoupled via a positional clamped by the plurality of adjustments during printing on the build plate.

19 Claims, 10 Drawing Sheets

(56) References Cited

U.S. PATENT DOCUMENTS

| | | | |
|---|---|---|---|
| 2016/0144563 A1 | 5/2016 | Elliott | |
| 2017/0173891 A1 | 6/2017 | Bosveld | |
| 2017/0291804 A1 | 10/2017 | Craft et al. | |
| 2017/0371317 A1* | 12/2017 | Share | B29C 64/393 |
| 2018/0001557 A1 | 1/2018 | Buller | |
| 2018/0056391 A1 | 3/2018 | Buller et al. | |
| 2020/0001590 A1* | 1/2020 | Holland | B29C 64/209 |
| 2020/0086569 A1* | 3/2020 | MacNeil | B29C 64/236 |

FOREIGN PATENT DOCUMENTS

| | | |
|---|---|---|
| CN | 204414600 | 6/2015 |
| CN | 204414600 U | 6/2015 |
| CN | 105328902 | 2/2016 |
| CN | 107379530 | 11/2017 |
| CN | 107599399 | 1/2018 |
| CN | 108284594 | 7/2018 |
| DE | 102015211538 | 12/2016 |
| EP | 2996865 | 3/2016 |
| EP | 3186065 | 7/2017 |
| WO | 2017184002 | 10/2017 |

OTHER PUBLICATIONS

International Search Report for PCT/US2019/0067146, dated Jun. 25, 2020.

Written Opinion of the International Searching Authority for PCT/US2019/067146, dated Jun. 25, 2020.

EPO Communication pursuant to Article 94(3) issued in App. No. EP19899495, dated Aug. 1, 2023, 8 pages.

EPO Communication pursuant to Article 94(3) issued in App. No. EP19899495, dated Apr. 4, 2024, 4 pages.

European search opinion dated Jan. 19, 2022 in App. No. EP 19899495, dated Jan. 19, 2024, 4 pages.

* cited by examiner

LEVELER FOR 3D PRINTING BUILD PLATE THERMAL EXPANSION

CROSS-REFERENCE TO RELATED APPLICATIONS

The present application claims benefit of priority to International Application No. PCT/US2019/067146, filed Dec. 18, 2019, entitled: "Leveler for 3D Printing Build Plate Thermal Expansion," which claims U.S. Provisional Application No. 62/783,016, filed Dec. 20, 2018, entitled: "3D Printing Build Plate Thermal Expansion," the entirety of which is incorporated herein by reference as if set forth in its entirety.

BACKGROUND

Field of the Disclosure

The present disclosure relates to additive manufacturing, and, more specifically, to an apparatus, system and method of providing a leveler for 3D printing build plate thermal expansion.

Description of the Background

The filament 3D printing process feeds a filament into a nozzle's liquefier, and melts that material as the nozzle with the material is moved in an X-Y and Z plane. The material changes from a solid filament state to a molten state back to a solid state as it exits the print head and reaches the print build. During the process of heating and cooling, the material expansion and contraction creates stresses in the part, and in application the parts being printed warp. To improve this disadvantage, it is known to heat the print environment.

However and by way of example, a build plate that is 500×500 mm, made of steel, and heated from 20 C to 200 C, will expand by 0.040". This expansion may cause serious mechanical binding if it is not addressed.

In one solution in the known art, to address the mechanical binding due to the expansion the build plate may be allowed to float on one side of the build plate mounting. However, the build plate mount is thus subjected to a substantial load due to the ½" thick metal build plate. This load imparts a friction, which may create a significant wear point.

On the other hand, if the plate is rigidly mounted, then when the plate expands, the mechanical system will still bind. In such a case, the mount plates will load up the bearings and add more friction for the z axis lead screw, as well as greatly reducing the life of the bearings.

Therefore, there is a need for an apparatus, system and method of providing a leveler for 3D printing build plate thermal expansion.

SUMMARY

The disclosure is and includes an apparatus, system and method for limiting build plate expansion in a 3D print environment. The apparatus, system and method may include a decoupling leveler associated with mounts for a build plate in the print environment; and a plurality of adjustments passing substantially through and mounted within the decoupling leveler. The leveler may be decoupled from the mounts during heating and cooling of the print environment, and recoupled via a positional clamped by the plurality of adjustments during printing on the build plate.

Thus, the disclosed embodiments provide an apparatus, system and method of providing a leveler for 3D printing build plate thermal expansion.

BRIEF DESCRIPTION OF THE DRAWINGS

The disclosed non-limiting embodiments are discussed in relation to the drawings appended hereto and forming part hereof, wherein like numerals indicate like elements, and in which.

DETAILED DESCRIPTION

Figure 1:
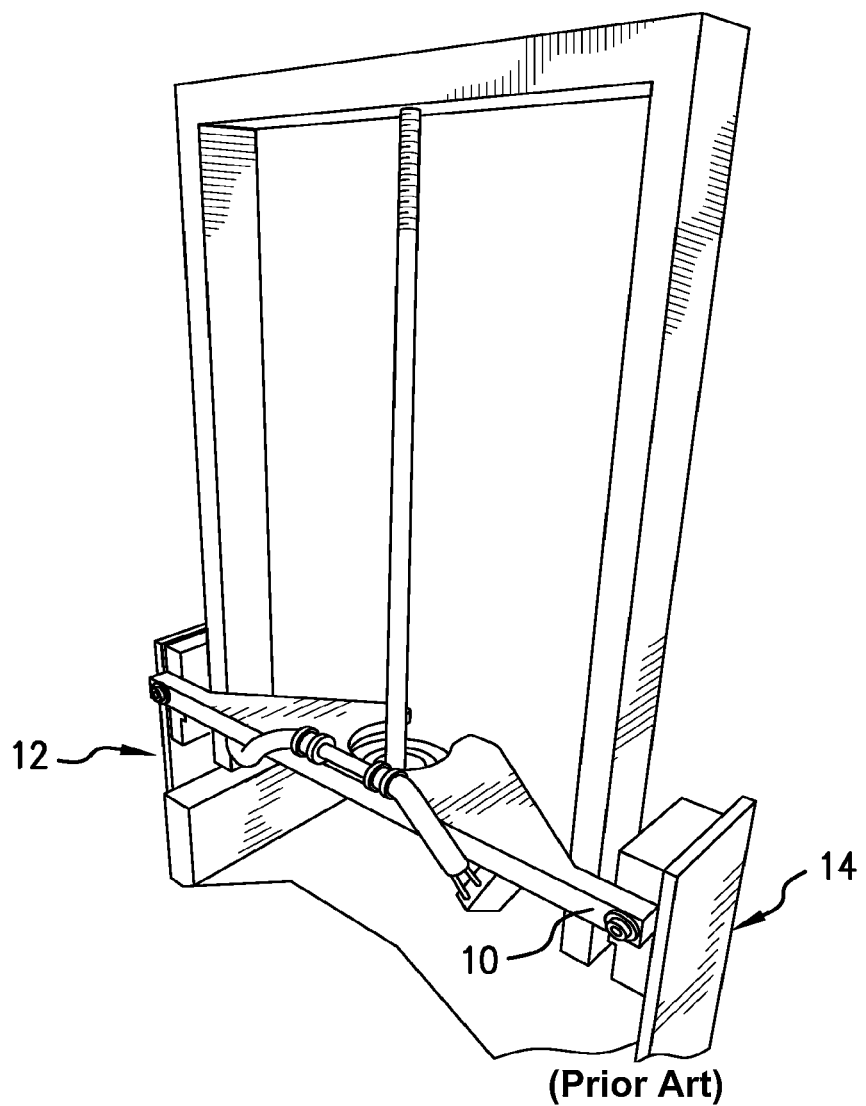
FIG. 1 illustrates aspects of the embodiments.

The figures and descriptions provided herein may have been simplified to illustrate aspects that are relevant for a clear understanding of the herein described devices, systems, and methods, while eliminating, for the purpose of clarity, other aspects that may be found in typical similar devices, systems, and methods. Those of ordinary skill may recognize that other elements and/or operations may be desirable and/or necessary to implement the devices, systems, and methods described herein. But because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

The terminology used herein is for the purpose of describing particular example embodiments only and is not intended to be limiting. For example, as used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc., may be used herein to describe various elements, components, regions, layers and/or sections, these elements, components, regions, layers and/or sections should not be limited by these terms. These terms may be only used to distinguish one element, component, region, layer or section from another element, component, region, layer or section. That is, terms such as "first," "second," and other numerical terms, when used herein, do not imply a sequence or order unless clearly indicated by the context. Thus, a first element, component, region, layer or section discussed below could be termed a second element, component, region, layer or section without departing from the teachings of the exemplary embodiments.

Processor-implemented modules and print systems are disclosed herein that may provide access to and transformation of a plurality of types of digital content, including but not limited to print plans and data streams, and the algorithms applied herein may track, deliver, manipulate, transform, transceive and report the accessed content. Described embodiments of these modules, apps, systems and methods are intended to be exemplary and not limiting.

An exemplary computing processing system for use in association with the embodiments, by way of non-limiting example, is capable of executing software, such as an operating system (OS), applications/apps, user interfaces, and/or one or more other computing algorithms, such as the print recipes, algorithms, decisions, models, programs and subprograms discussed herein. The operation of the exemplary processing system is controlled primarily by non-transitory computer readable instructions/code, such as instructions stored in a computer readable storage medium, such as hard disk drive (HDD), optical disk, solid state drive, or the like. Such instructions may be executed within the central processing unit (CPU) to cause the system to perform the disclosed operations. In many known computer servers, workstations, mobile devices, personal computers, and the like, CPU is implemented in an integrated circuit called a processor.

It is appreciated that, although the exemplary processing system may comprise a single CPU, such description is merely illustrative, as the processing system may comprise a plurality of CPUs. As such, the disclosed system may exploit the resources of remote CPUs through a communications network or some other data communications means.

In operation, CPU fetches, decodes, and executes instructions from a computer readable storage medium. Such instructions may be included in software. Information, such as computer instructions and other computer readable data, is transferred between components of the system via the system's main data-transfer path.

In addition, the processing system may contain a peripheral communications controller and bus, which is responsible for communicating instructions from CPU to, and/or receiving data from, peripherals, such as 3D printers and/or the operator interaction elements to formulate a print, as discussed herein throughout. An example of a peripheral bus is the Peripheral Component Interconnect (PCI) bus that is well known in the pertinent art.

An operator display/graphical user interface (GUI) may be used to display visual output and/or presentation data generated by or at the request of processing system, such as responsive to operation of the aforementioned computing programs/applications. Such visual output may include text, graphics, animated graphics, and/or video, for example.

Further, the processing system may contain a network adapter which may be used to couple to an external communication network, which may include or provide access to the Internet, an intranet, an extranet, or the like. Communications network may provide access for processing system with means of communicating and transferring software and information electronically. Network adaptor may communicate to and from the network using any available wired or wireless technologies. Such technologies may include, by way of non-limiting example, cellular, Wi-Fi, Bluetooth, infrared, or the like.

The embodiments may greatly improve the overall design of a 3D print environment by limiting build plate expansion. This may be accomplished, in part, by allowing the system to heat up without the build plate imparting loads on the mounting brackets.

That is, the build plate may be decoupled from the mounts for the heating or cooling process and then re-engaged once the environment reaches a saturated state. This may be accomplished by mechanically uncoupling the build plate using custom positional adjustments, such as spring loaded clamps.

The embodiments may be included as an aspect of a thermal chamber around the build area. The heater may provide the capability to heat the chamber to over 200 C-250 C without departing from the scope of the embodiments.

More particularly, a typical build plate that is 500×500 mm is made of steel that will expand 0.040". This expansion may cause mechanical binding. To address the mechanical binding due to the expansion, one side of the build plate mounting 10 may be fixed 12, and one side may be allowed to "float" 14, as illustrated in FIG. 1.

As the build plate is heated and expands, the floating side of the build plate mount may move along two shoulder bolts and two dowel pins, for example. The mounting has a heavy load due to the ½" thick metal build plate. This load imparts a friction on the two shoulder boulder bolts and two dowel pins, which will restrict how well the plate will slide. The friction on the sliding motion creates a wear point.

Figure 2A:
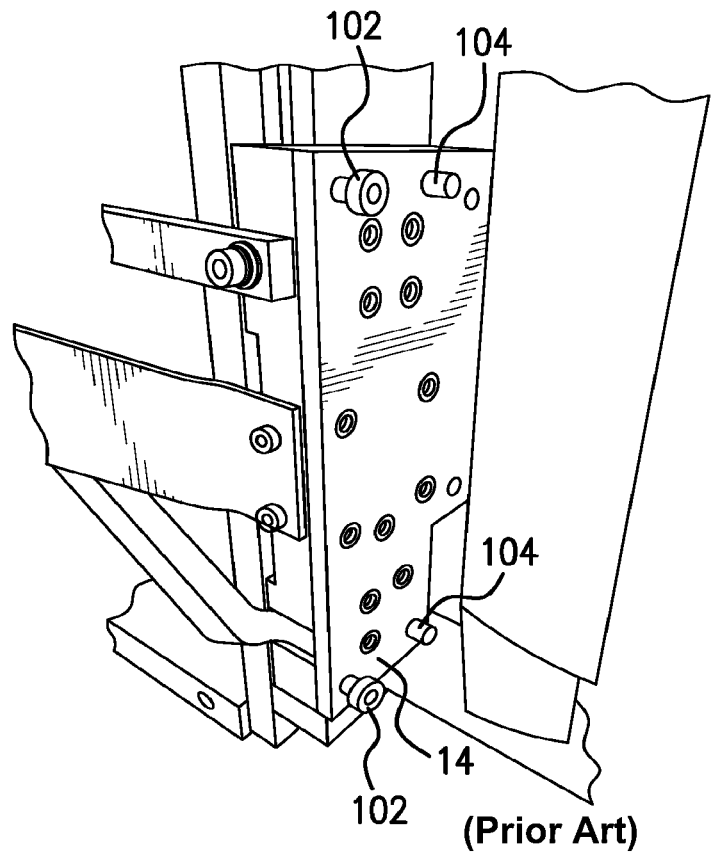
FIG. 2 illustrate aspects of the embodiments.
Figure 2B:
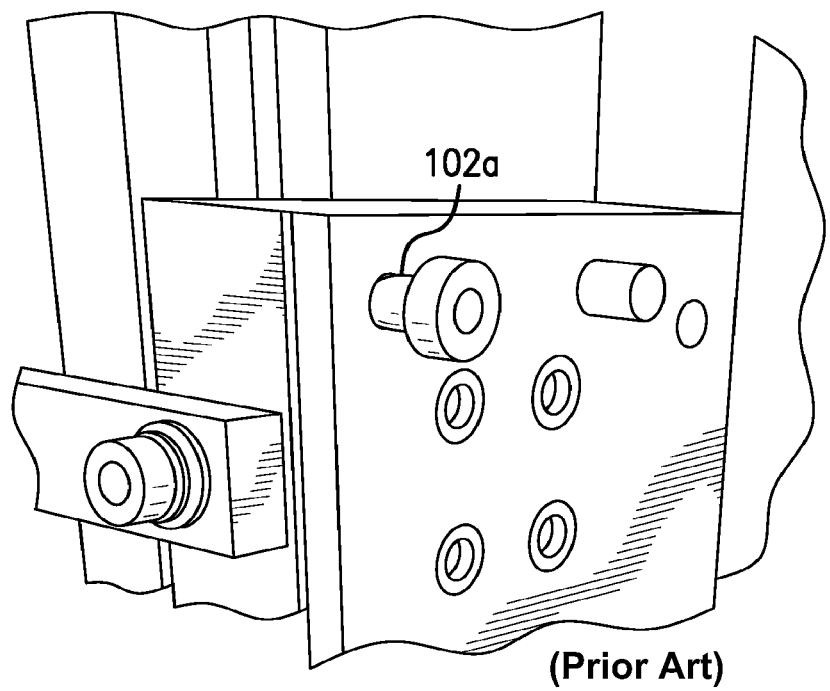

FIGS. 2A and 2B show the floating plate side 14 with the shoulder bolts 102 and dowel pins 104. To the right is a close up of the top shoulder bolt 102a, and it appears the hole is already wearing. When this wears, it will change the level of the build plate, causing build issues.

The embodiments greatly improve the overall design of the build plate expansion, in part by allowing the system to heat up without the build plate imparting loads on the mounting brackets. More specifically, the build plate is decoupled from the mounts for the heating or cooling process, and then re-engaged once the environment reaches a saturated state.

This is accomplished by mechanically uncoupling the build plate through custom designed spring clamps. In low temperature applications, this may similarly be executed with high temperature cylinders. At 200 C, a clamping solution may be needed.

The design uses a high force spring system that is mechanically unclamped. This allows for a solution that can handle 200 C.

Figure 3A:
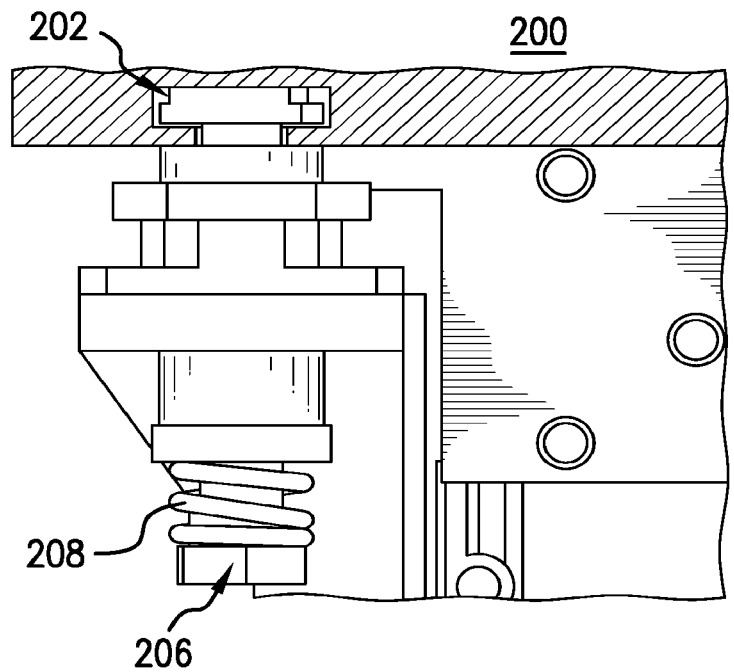
FIG. 3 illustrate aspects of the embodiments.
Figure 3B:
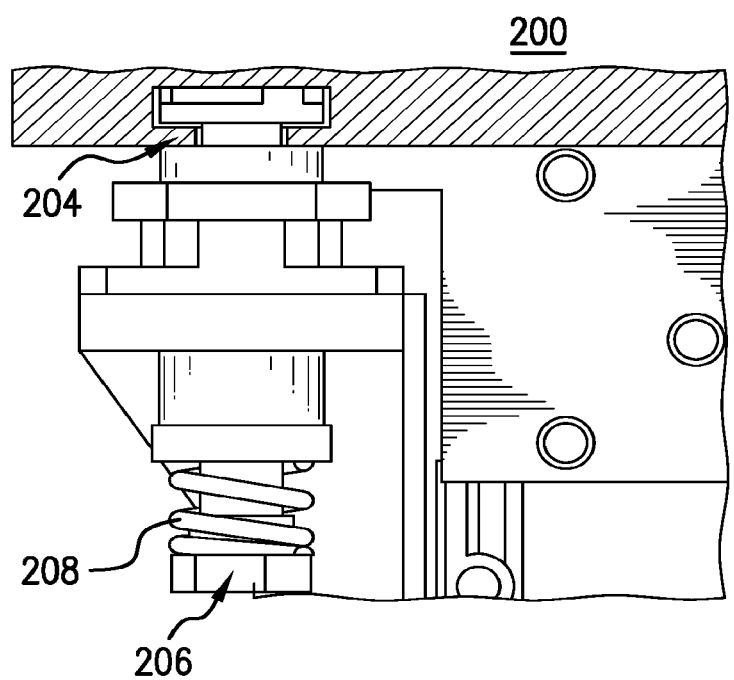

For example, FIGS. 3A and 3B illustrate an alternately unclamped 202 and clamped 204 spring loaded build plate adjustment system 200. More particular, a load at switch point 206 causes the build plate to unclamp. Unloading of spring system 208 at switch point 206 causes the build plate to clamp.

Figure 4:
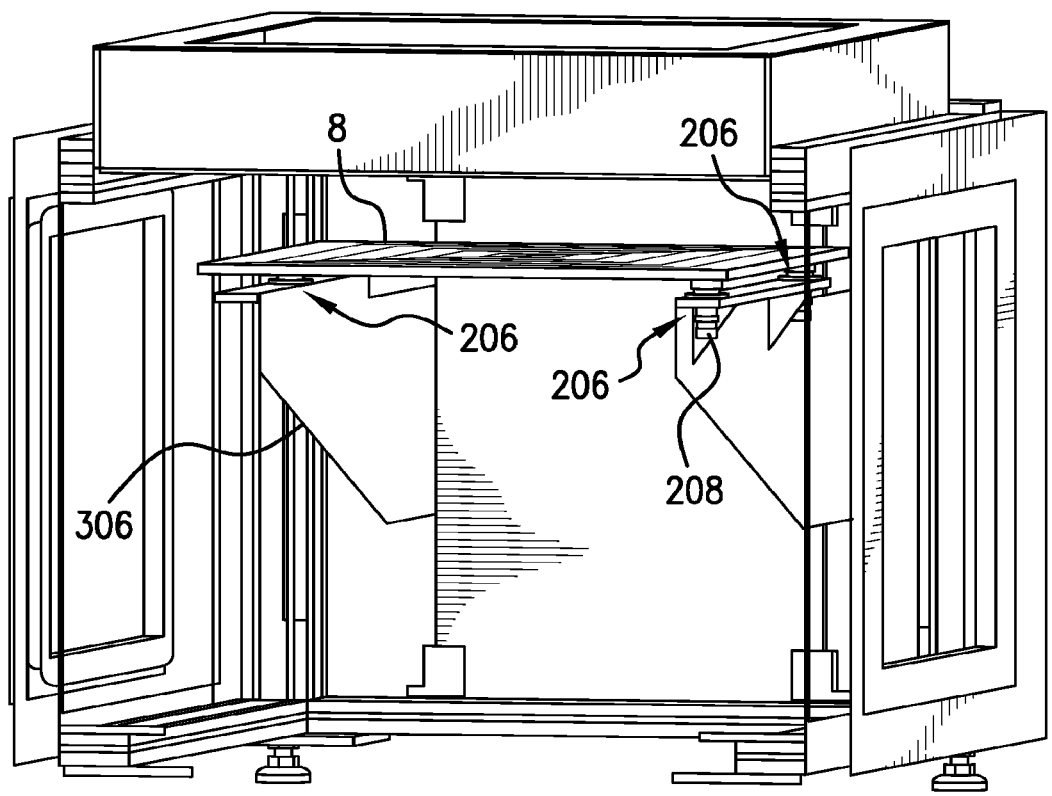
FIG. 4 illustrates aspects of the embodiments.

FIG. 4 illustrates the spring loaded plate adjustment system 200 in use at various adjustment points on the build plate axis drive 306. More particularly, FIG. 4 shows the build plate 8 with three such spring loaded clamp/adjustment points 206.

Figure 5:
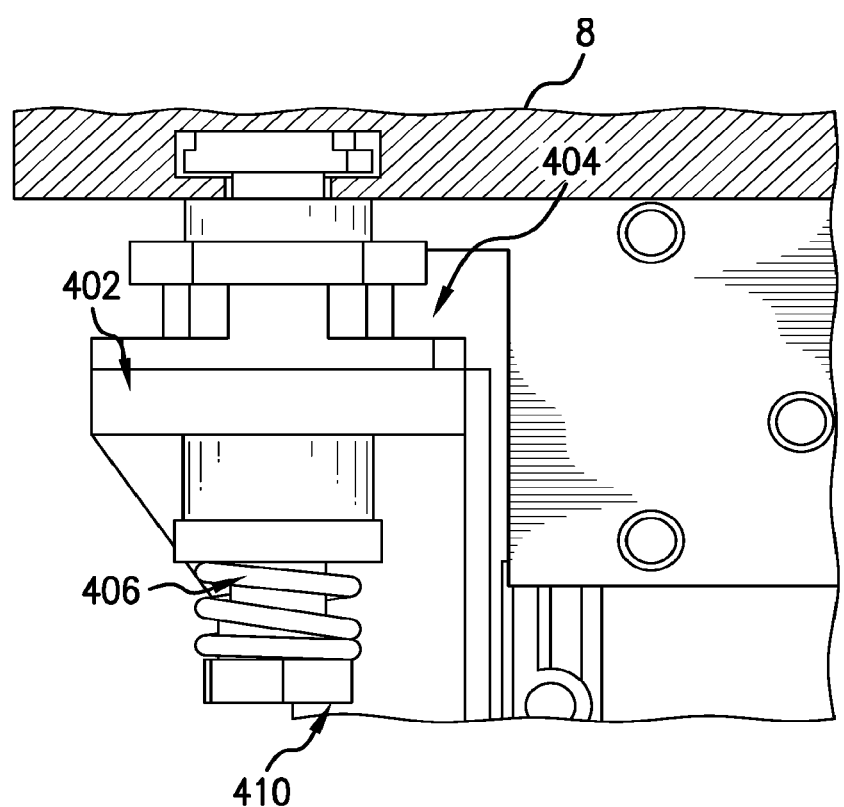
FIG. 5 illustrates aspects of the embodiments.

The build plate needs to be level, as discussed throughout. The leveling system 200 disclosed may be integrated into the clamp design. For example, and as shown in FIG. 5, component 402 may have a thread on the ID thereof. Component 404 is a lock nut to hold the position of the component 406, once adjusted. Component 406 is raised and lowered using a wrench on the flats on the base section of the component. The spring load can then be adjusted by loosening or tightening the component 410.

Figure 6A:
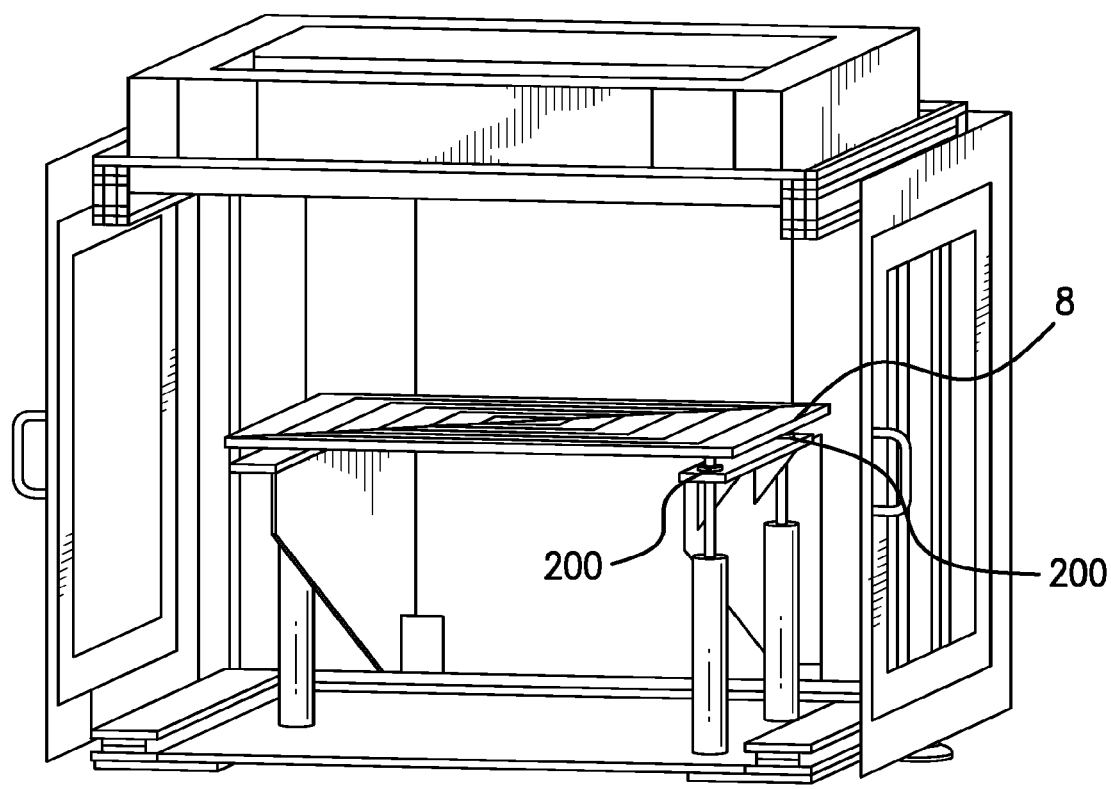
FIG. 6 illustrate aspects of the embodiments.
Figure 6B:
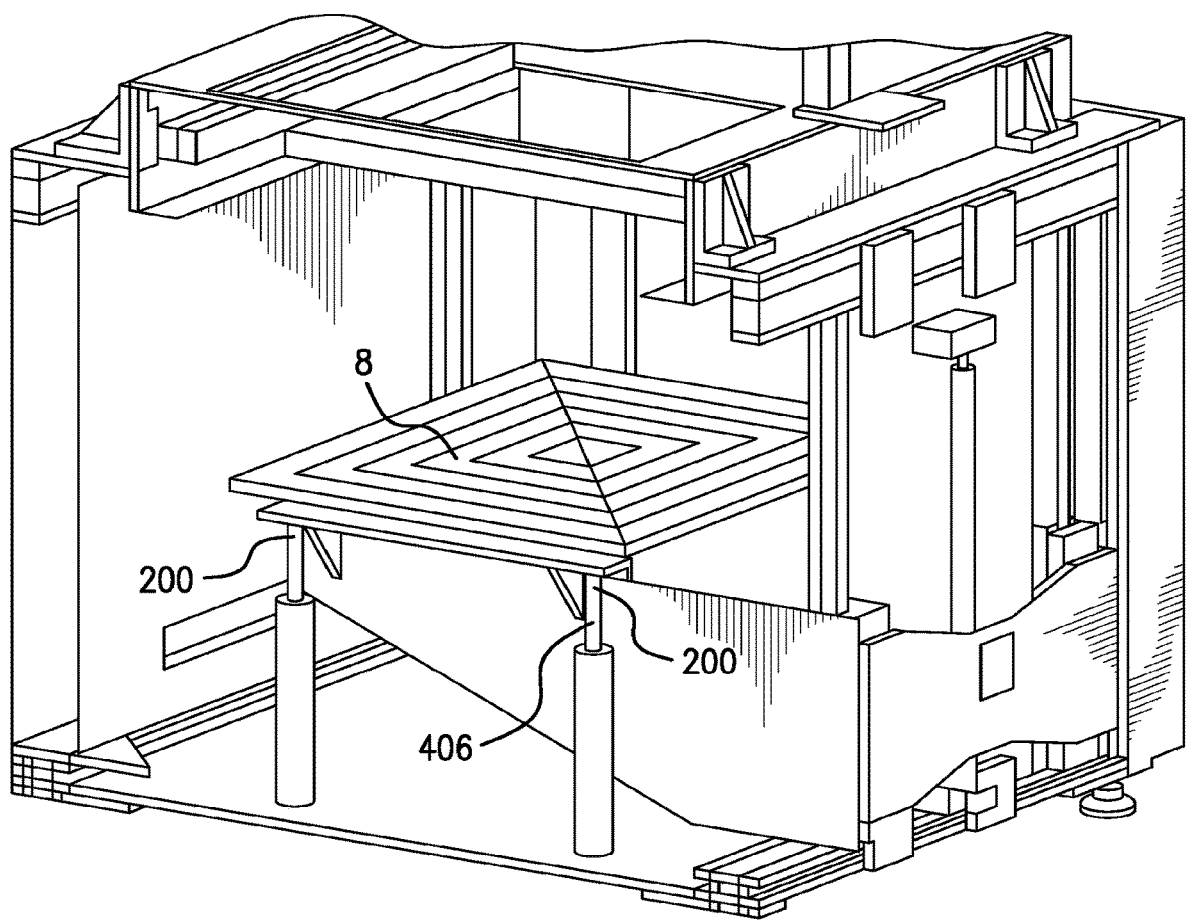

FIGS. 6A and 6B show the build plate 8 moved down in Z until it contacts and drives the build plate into the fixed spring unclamped adjusters of the build plate adjustment system 200. Once the Z has moved to this position, the heater will start to heat the environment. During the heating process the build plate 8 can freely float in X-Y on the top of component 406. Once the environment reaches the desired temperature, the Z axis will slowly move up in Z and the spring pins of the build plate adjustment system 200 will again clamp the build plate 8.

The build plate location need not be repeatable. All prints may start fresh on a new build plate. A key element of the embodiments, however, is that the build plate should not move once the print starts.

Needless to say, a desirable feature of the embodiments is the capability to level the build plate at temperature. However, manual adjustment of the spring loaded clamping points, when the hardware is at 220 C, may be challenging.

Accordingly, rather than three floating clamps/adjustment points as referenced above in the example of FIG. 4, one or two of the pins of the build plate adjustment system 200 may be bolted or locked permanently. The thermal expansion may then be taken up by the other two floating pins of the build plate adjustment system 200 (or by the one other floating pins, if two positional adjustments are locked).

In such an alternative embodiment, the two floating clamps of the build plate adjustment system 200 need enough room to account for the expansion, given the absence of the accounting by the third pin. Of note, as the expansion starts at the permanent bolts and expand away, permanently attaching one of the three clamps used in FIG. 4 may provide substantially more rigidity to the system.

Of course, other mechanical aspects may impede the performance of the embodiments. For example, vibration may occur in the build plate during the build. This vibration may create small X-Y or rotational motions on the build plate, which would then be translated to the actual print.

Figure 7:
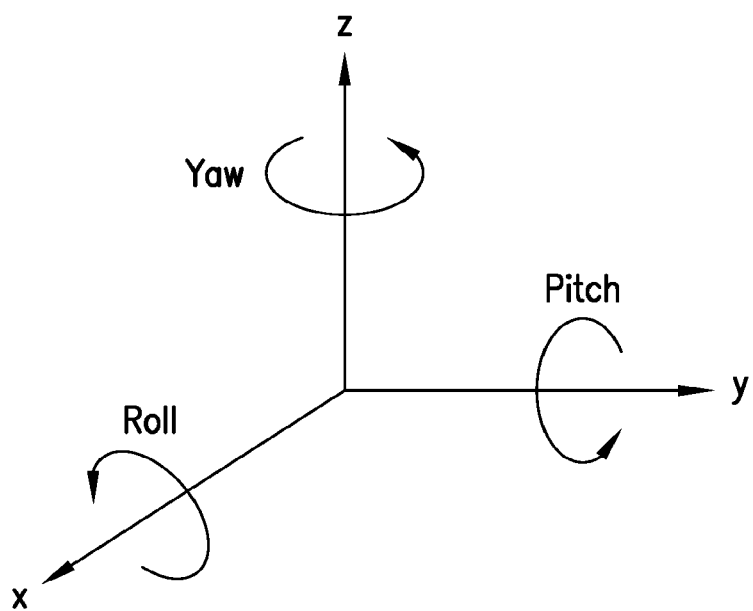
FIG. 7 illustrates aspects of the embodiments.

A 3 screw Z-motion control positional adjustment (rather than the one or two point positional adjustment embodiments referenced immediately above), akin to that of FIG. 4, may remedy such small movements in the build plate. By way of example, with sensor readings in three places on the build plate, such as from a sensor on the X-Y stage, we can use the three screws to level the build plate. That is, as shown in FIG. 7, three screws, combined with positional sensing, may enable vibration/motion control in 3 axes.

Figure 8A:
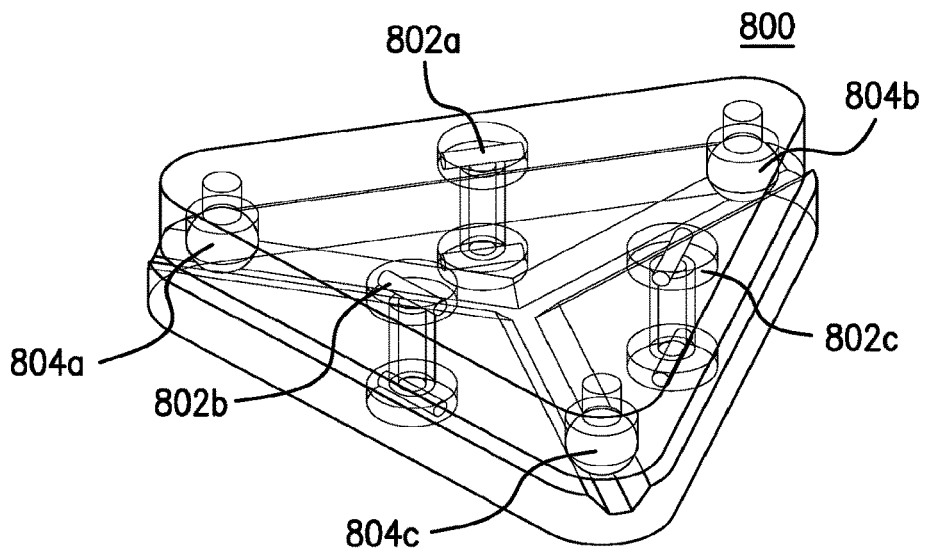
FIG. 8 illustrate aspects of the embodiments.
Figures 8B, 8C:
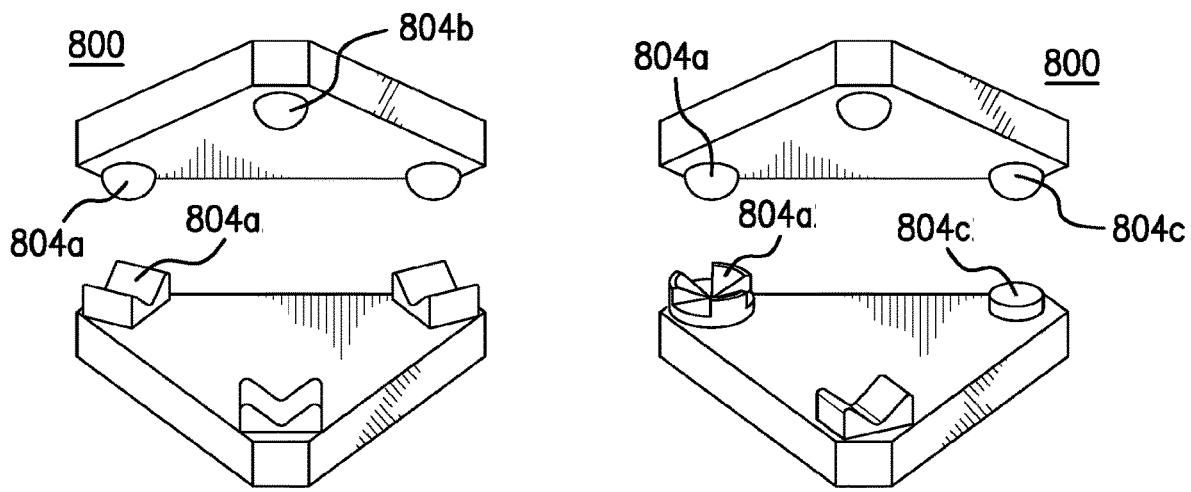

FIGS. 8A, 8B and 8C illustrate a three positional adjustment embodiment 802a, 802b and 802c. As will be evident to the skilled artisan, and with reference also to FIG. 7, the three positional adjustments, unlike single bolted or two clamp embodiments, enable adjustment in the yaw, pitch or roll of the build plate.

More particularly, FIG. 8 illustrate the use of a kinematic mount 800 to constrain the build plate using three screws 802 a, b, c to drive level. Three levelers, such as balls, 804 a, 804 b and 804 c may enable the three screw positional adjustment to level.

Figure 9:
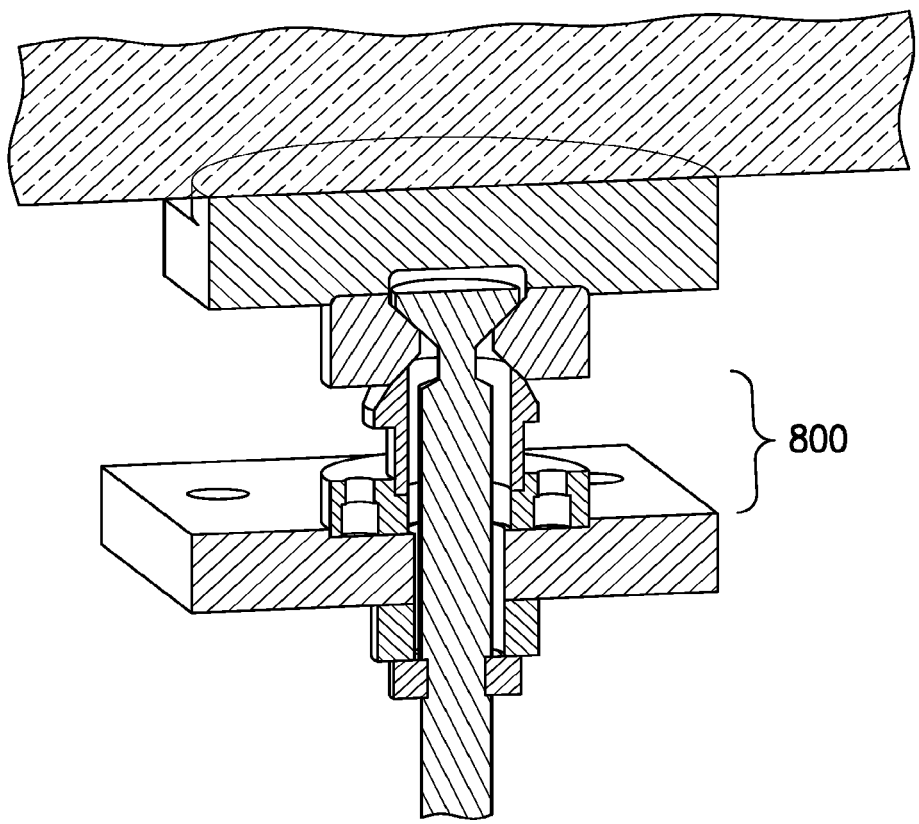
FIG. 9 illustrates aspects of the embodiments.

In operation, the three adjustments 802a, b, c may be free to move while the build plate goes from ambient to the desired build chamber temperature. Once the build temperature is reached, the positional adjustments may be locked. A kinematic mounts 800, such as that in FIG. 8, is shown in FIG. 9.

The immediately foregoing embodiments are directed principally to simplifying manual adjustments. However, the embodiments may also include automated leveling.

For example, the build plate may move up in Z to a position where a sensor can be used to measure the distance from the print head to the build plate. This may be done in at least three positions. Multi-position sensing may be done, and a cool averaging algorithm employed, by way of example, to obtain data and determine level.

Thereafter, the three positional adjustments discussed throughout may be clamped/screwed in order to level the build plate. The aforementioned sensing may verify a leveling of the plate to a predefined tolerance.

A back down may then be performed with an unclamped locking mechanism. However, the three screws may hold their positions in Z, i.e., the new leveled position, and after a delay, the Z axis may move back up, re-clamping the build plate with the system unloaded from the leveling effort.

In yet another aspect, the convection oven at the print area may be deactivated when it is not needed, such as, for example, during fill moves. The convection oven may then be turned on only when needed, such as during contour moves.

A dual heater arrangement may also be employed. For example, heating below the build plane may be constantly provided using convection style heating, while, at the build plane, heating may be provided variably. The advantages of the foregoing include a decrease in anisotropy of physical parts because of the variable heating, but a maintaining of dimensional tolerances because of the convection heating.

In the foregoing Detailed Description, it can be seen that various features are grouped together in a single embodiment for the purpose of clarity and brevity of the disclosure. This method of disclosure is not to be interpreted as reflecting an intention that the embodiments require more features than are expressly recited herein. Rather, the disclosure is to encompass all variations and modifications to the disclosed embodiments that would be understood to the skilled artisan in light of the disclosure.

What is claimed is:

1. A limiter for build plate expansion in a 3D print environment, comprising:
   a build plate adjustment system associated with mounts for a build plate in the print environment; and
   a plurality of adjustments passing substantially through and mounted within the build plate adjustment system;
   wherein the build plate adjustment system is configured to be actuated via a vertical movement of the build plate causing an addition of or a removal of a load on at least one load switch point of the build plate adjustment system.

2. The limiter of claim 1, wherein the plurality of adjustments comprises spring loaded clamps.

3. The limiter of claim 1, wherein the plurality of adjustments comprise three adjustments.

4. The limiter of claim 1, wherein the build plate adjustment system is actuated during a heating or a cooling of the print environment.

5. The limiter of claim 1, wherein the build plate is steel.

6. The limiter of claim 1, wherein the build plate is about 500×500 mm.

7. The limiter of claim 1, wherein the expansion is about 0.040 inches.

8. The limiter of claim 1, wherein each of the plurality of adjustments lacks a wear point.

9. The limiter of claim 1, wherein the addition of or the removal of the load is manual.

10. The limiter of claim 1, wherein the addition of or the removal of the load counteracts a spring constant.

11. The limiter of claim 1, wherein the actuation of the build plate adjustment system is automated.

12. The limiter of claim 1, wherein the plurality of adjustments comprise yaw, pitch and roll adjustments.

13. The limiter of claim 12, wherein the plurality of adjustments is present within a kinematic mount.

14. The limiter of claim 13, wherein the plurality of adjustments comprise screws through the kinematic mount in conjunction with kinematic balls responsive to turning of the screws.

15. The limiter of claim 1, further comprising at least one sensor capable of sensing a distance from the build plate to an output of the print.

16. The limiter of claim 15, wherein the at least one sensor comprises a three position sensor.

17. The limiter of claim 16, further comprising a processing system capable of applying a leveling algorithm, including at least an averaging algorithm, to data output by the sensor.

18. The limiter of claim 1, wherein a heater for the print environment is turned on and off in conjunction with the actuation of the build plate adjustment system during the print.

19. The limiter of claim 1, wherein a portion of the build plate adjustment system is locked to the build plate.

* * * * *